(12) United States Patent
Gokavi et al.

(10) Patent No.: US 11,933,347 B2
(45) Date of Patent: Mar. 19, 2024

(54) RIVET-TYPE FASTENER

(71) Applicant: Illinois Tool Works Inc., Glenview, IL (US)

(72) Inventors: Mahantesh S. Gokavi, Maharashtra (IN); Ganesh Kumar, Maharashtra (IN); Lokesh Chauhan, Maharashtra (IN); Bhupendra Pandey, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 147 days.

(21) Appl. No.: 16/810,991

(22) Filed: Mar. 6, 2020

(65) Prior Publication Data

US 2020/0284280 A1    Sep. 10, 2020

(30) Foreign Application Priority Data

Mar. 8, 2019    (IN) .............................. 201921009198

(51) Int. Cl.
  *F16B 19/10*    (2006.01)
  *F16B 5/04*    (2006.01)
  *B60R 13/02*    (2006.01)

(52) U.S. Cl.
  CPC ............ *F16B 5/04* (2013.01); *F16B 19/1027* (2013.01); *B60R 13/0206* (2013.01)

(58) Field of Classification Search
  CPC .............. F16B 19/1027; F16B 19/1081; F16B 2019/006; F16B 5/04; B29C 2045/4089
  See application file for complete search history.

(56) References Cited

U.S. PATENT DOCUMENTS

| | | | | |
|---|---|---|---|---|
| 4,927,287 A | * | 5/1990 | Ohkawa | F16B 21/086 24/297 |
| 2002/0001513 A1 | * | 1/2002 | Tanaka | F16B 19/1081 411/45 |
| 2005/0019130 A1 | * | 1/2005 | Kanie | F16B 19/1081 411/45 |
| 2007/0172327 A1 | * | 7/2007 | Hansen | F16B 19/1081 411/41 |
| 2008/0298925 A1 | * | 12/2008 | Shinozaki | F16B 19/1081 411/48 |

(Continued)

FOREIGN PATENT DOCUMENTS

| | | |
|---|---|---|
| CN | 1542296 A | 11/2004 |
| CN | 101253339 A | 8/2008 |
| WO | 2013070863 A1 | 5/2013 |

*Primary Examiner* — Kyle A Cook
(74) *Attorney, Agent, or Firm* — Quarles & Brady LLP

(57) ABSTRACT

Examples of rivet-type fastener are described. The rivet-type fastener may further include a fastener pin. The fastener pin includes a planar head portion and a shaft longitudinally extending from the head portion. The fastener pin may further include a cantilevered snap element at a distal end of the shaft. A portion of the cantilevered snap element is flexibly moveable with respect to the axis of shaft. The rivet-type fastener comprises a fastener body which in turn comprises a collared portion with a central opening. A plurality of elongated portions extend orthogonally from the collared portion, wherein the elongated portions are radially positioned about the central axis and about the edges of the central opening.

16 Claims, 8 Drawing Sheets

(56) References Cited

U.S. PATENT DOCUMENTS

| | | | |
|---|---|---|---|
| 2009/0056087 A1* | 3/2009 | Arisaka | F16B 19/1081 24/455 |
| 2011/0170982 A1* | 7/2011 | Watanabe | F16B 19/1081 411/360 |
| 2012/0174354 A1* | 7/2012 | Sato | F16B 19/1081 24/595.1 |
| 2013/0280005 A1* | 10/2013 | Lepper | F16B 19/1027 411/15 |
| 2013/0287517 A1* | 10/2013 | Fujiwara | F16B 19/1081 411/54.1 |
| 2014/0047679 A1* | 2/2014 | Lepper | F16B 21/086 24/453 |
| 2016/0161206 A1* | 6/2016 | Nakayama | F41C 23/16 29/428 |
| 2017/0198738 A1* | 7/2017 | Najima | F16B 13/06 |

* cited by examiner

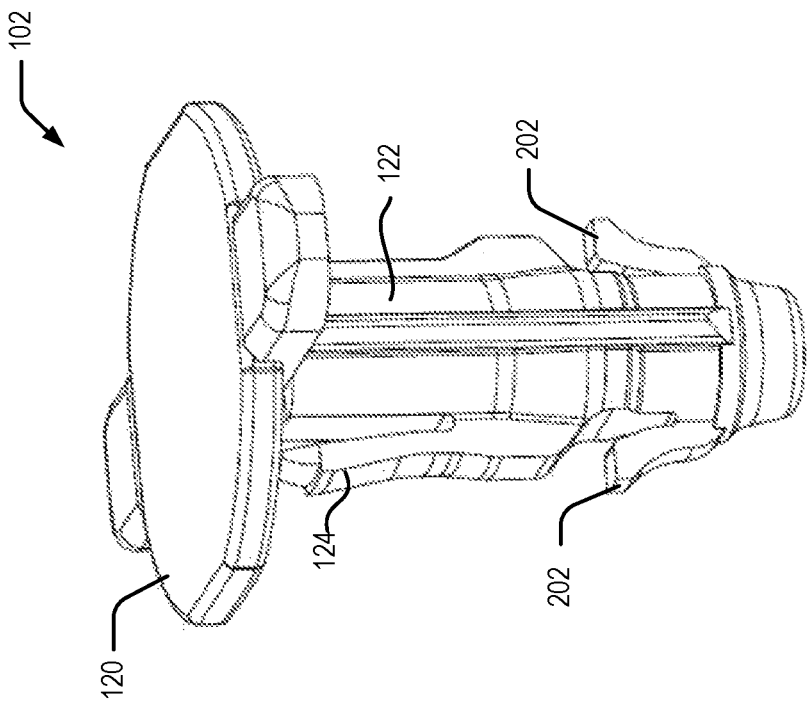
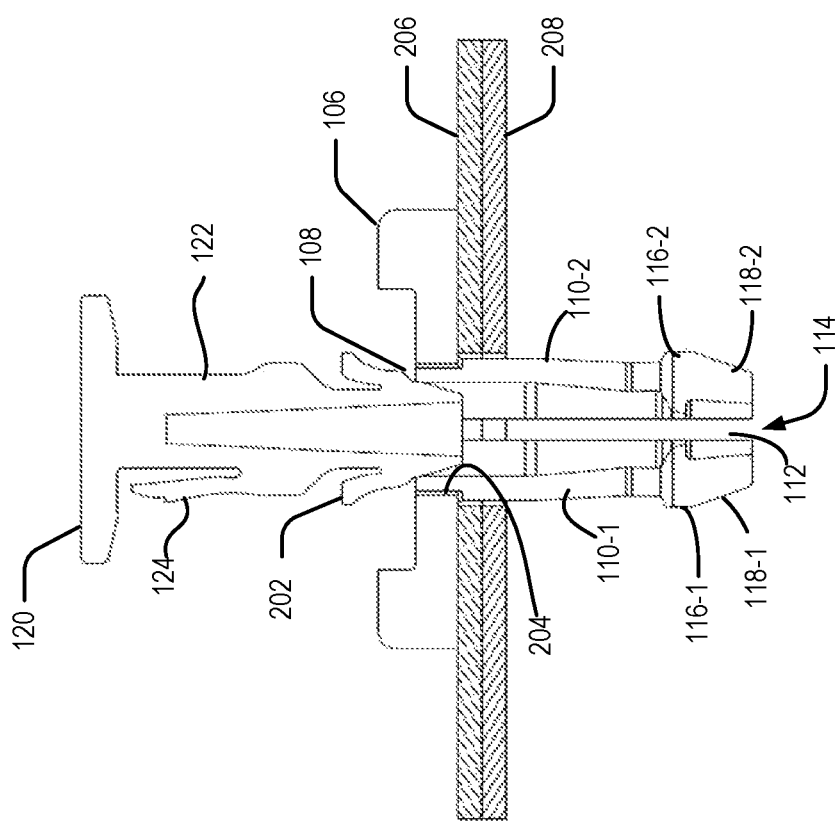
FIG. 2B
FIG. 2A

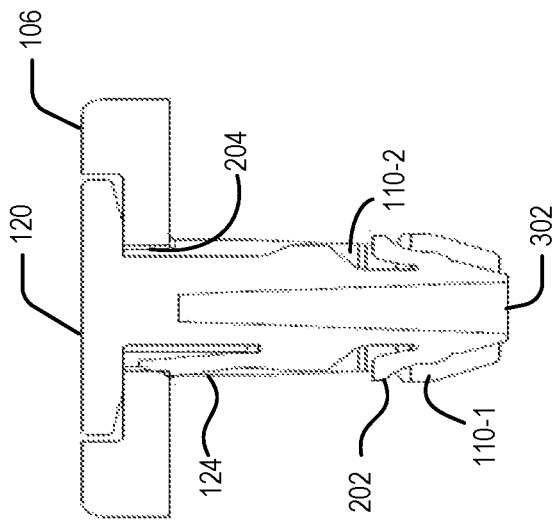
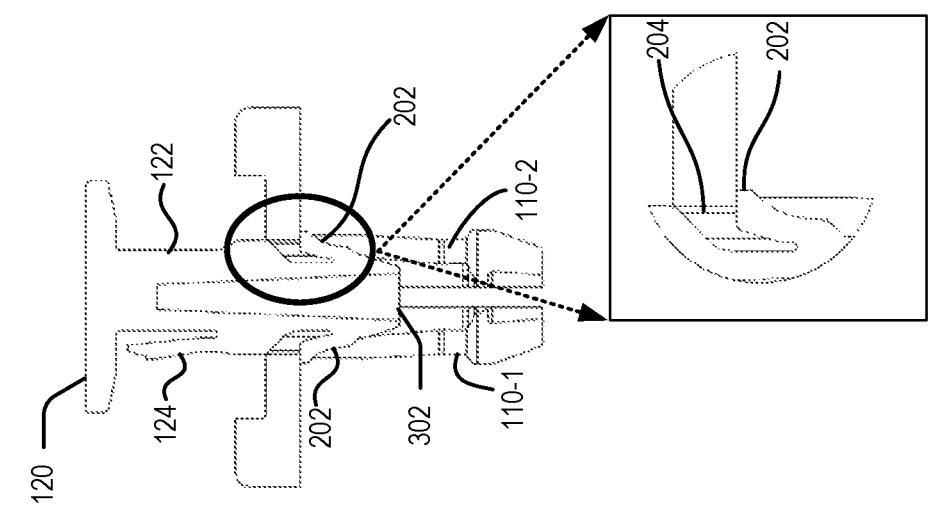
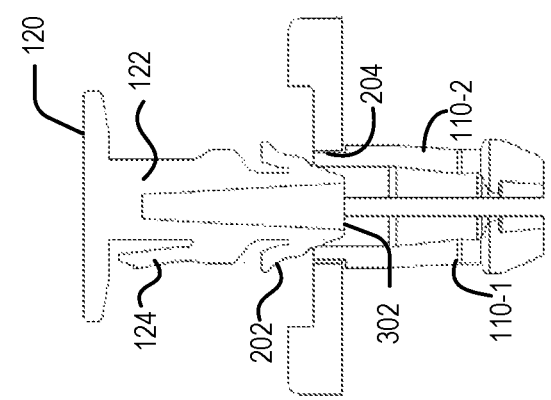
FIG. 3C
FIG. 3B
FIG. 3A

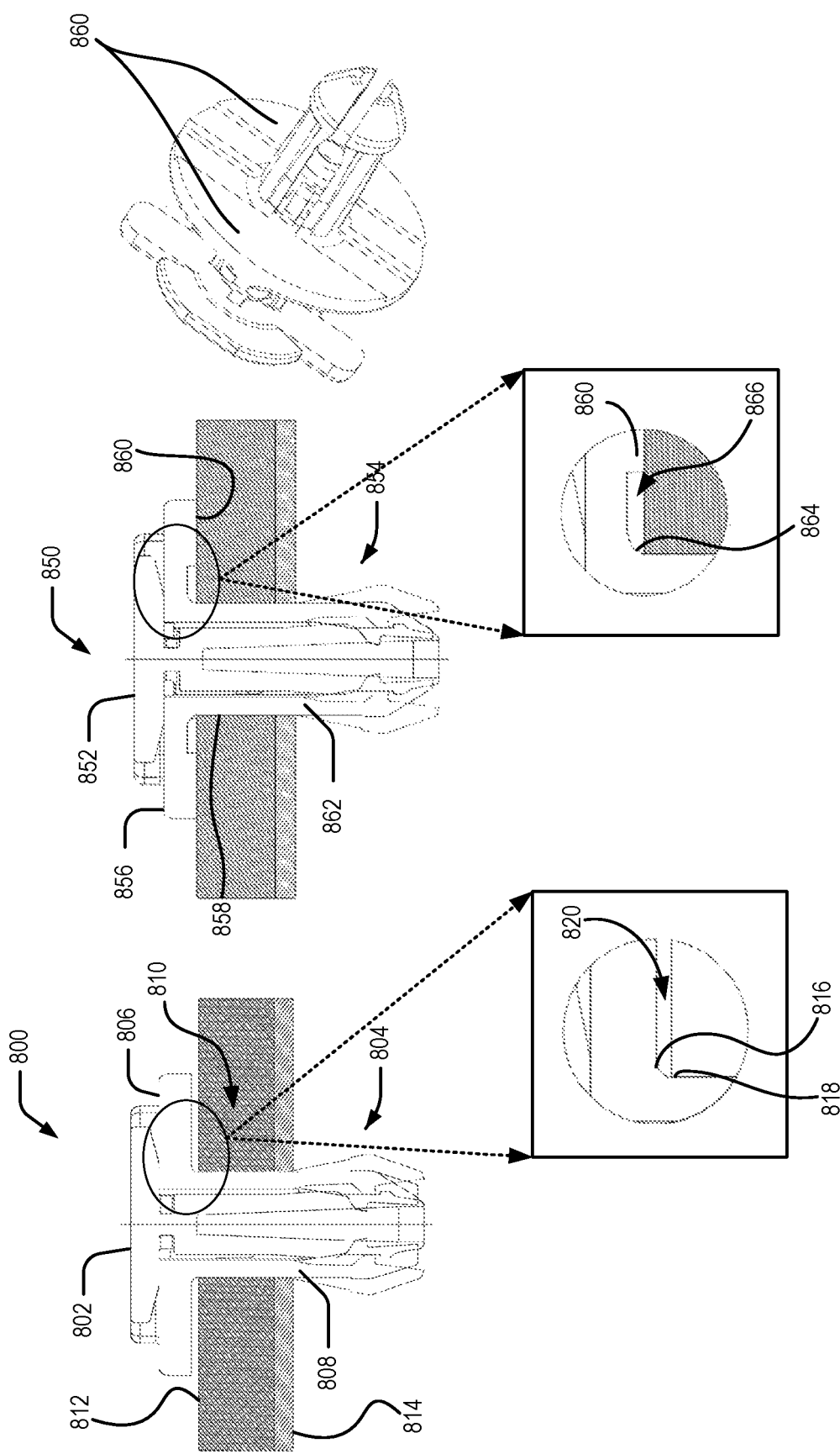

RIVET-TYPE FASTENER

CROSS REFERENCE TO RELATED APPLICATIONS

This application is based on, claims priority to, and incorporates herein by reference in its entirety Indian Patent Application No. 201921009198, filed on Mar. 8, 2019, and entitled "A RIVET-TYPE FASTENER".

BACKGROUND

A rivet-type fastener is typically used in vehicles for securing articles to supporting structures, such as the body of a vehicle. Examples of such articles include, but are not limited to interior panel, exterior panels, and interior or exterior moulding or trim. Generally, such fastener includes a fastener body and a fastener pin. The fastener body may further include a hole through which the fastener pin may be inserted. For fastening the article onto the body of the automobile, the hole of the fastener body may be aligned with the hole in the article and the corresponding hole onto the body of the automobile. Once aligned, the fastener pin may be inserted upon which it may get engaged openings of the article or the body of the automobile. Once engaged, the article is securely attached to the body of the automobile.

BRIEF DESCRIPTION OF DRAWINGS

The detailed description is provided with reference to the accompanying figures, wherein:

FIG. 2A illustrates a cross-sectional view of a rivet-type fastener, in accordance with an example of the present subject matter;

FIG. 2B illustrates a perspective view of a rivet-type fastener pin, in accordance with one example of the present subject matter;

FIGS. 3A-3C illustrates cross-sectional views of the rivet-type fastener in various stages of installation, in accordance with one example of the present subject matter;

FIGS. 8A-8C illustrates various views of a fastener with supporting protrusions, in accordance with yet another implementation of the present subject matter.

Figure 1:
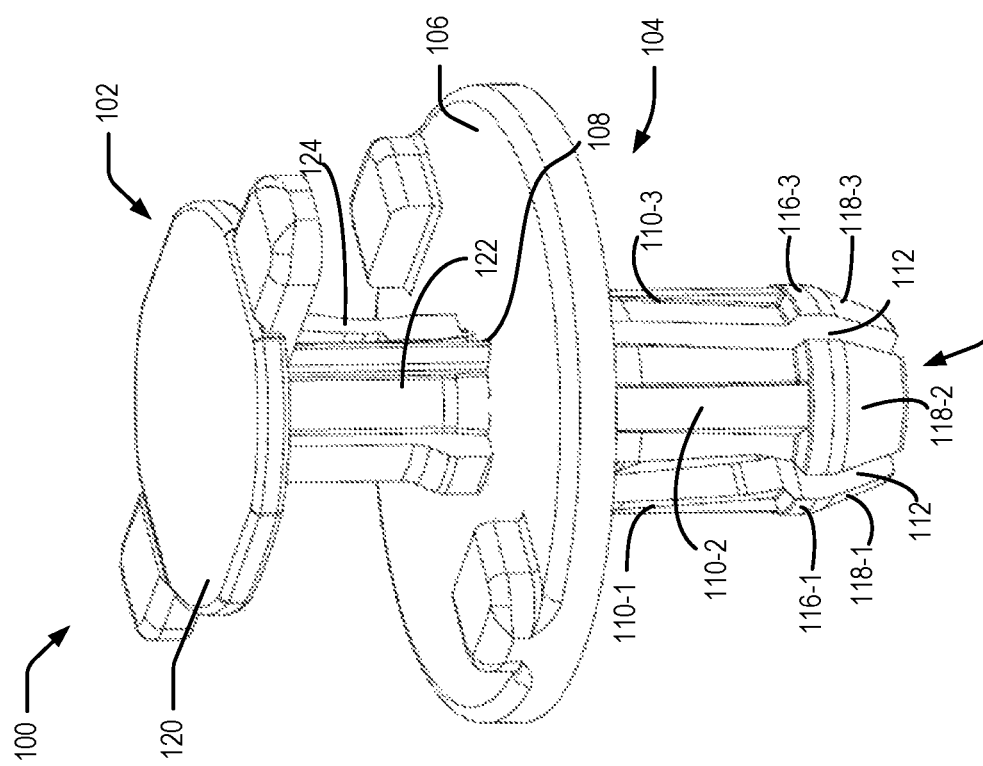
FIG. 1 illustrates a perspective view of a rivet-type fastener, in accordance with one example of the present subject matter.

It may be noted that throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As discussed previously, rivet-type fasteners allow various articles or panels to be securely attached to the body of the automobile. In certain known rivet-type fasteners, the fastener body and the fastener pin are independent components, which may be separate from each other before installation. One end of the fastener body may typically include a collared portion, the dimensions of which are larger than the dimensions of the openings through which it was inserted. The fastener body may further include a plurality of flexible elongated portions which may extend in a direction which is orthogonal to the collared portion. As the fastener body is aligned and inserted into the holes of the article and the body, the flexible elongated portions pass through the opening till the collared portion rests on the surface of the article which is to be fastened. The fastener pin, being a rigid body, on being inserted may abut against the inner surfaces of the flexible elongated portions owing to which the elongated portions may bend to move in an outward-radial direction engaging against the body of the supporting structure onto which the article is being fastened.

Generally, the fastener body and pin may be independent components, and may be completely separate from one another before installation. In such cases, the fastener pin may be prone to being misplaced. In some cases, the fastener may have to installed in spaces which do not allow maneuverability and may restrict the ease with which the fastener may be installed. Particularly when the fastener pin is relatively short, the installer attempting to position the pin in the body can be hindered by the edge of the channel or well in which the fastener body is positioned. This configuration can substantially slow the installation process, especially if the pin is dropped or misplaced during installation. Accordingly, it is desirable to provide a rivet-type fastener including a body and pin that are more easily manipulated within a restricted installation area.

Examples of a rivet-type fastener is described. The rivet-type fastener includes a fastener body and a fastener pin. The fastener pin may include a head portion and a shaft which extends from the head of the fastener pin. In one example, the rivet-type fastener may further include a cantilevered snap element provided at the end of the shaft of the fastener pin. The cantilevered snap element is such that it permits the fastener pin to be inserted into the hole in the collared portion of the fastener body. As the fastener pin passes through the hole, the cantilevered snap element may slightly deform inwards thereby allowing the movement of the fastener pin through the hole. As soon as the cantilevered snap element crosses the edges of the hole of the collared portion, the cantilevered snap element regains its original shape. Once the cantilevered snap element regains its initial shape, it prevents the withdrawal of the fastener pin from the hole of the collared portion.

At this stage, the fastener pin is only partially inserted into the fastener body. In this manner, the rivet-fastener, i.e., the fastener body along with the partially inserted fastener pin, may then be utilized for securing the desired article to the body of the automobile. Since the fastener pin is securely retained within the fastener body, the possibility of misplacing or losing the fastener pin during installation is substantially reduced.

In an example, the fastener pin may be further provided with a spring element which is positioned along the shaft of the fastener pin. For installation, the fastener body (along with the partially inserted fastener pin) may be positioned onto the desired location, wherein the rivet-fastener is to be fastened. Once positioned, the fastener pin may be completely inserted through the collared portion. Once the fastener pin is fully inserted, a locking action of the spring element engages with an inner edge of the fastener body thereby securing the fastener pin in the fastener body. In yet another example, the flexible elongated portions of the fastener body may be provided with additional ribbed protrusions to provide a better engagement with the opening through which the rivet-type fastener may be inserted. The rivet-type fastener, as described, further includes access channels in the collared portion of the fastener body to allow the fastener pin to be partially pulled out from the fastener body of the rivet-type fastener through any prying tool (e.g., a screw driver).

The above aspects are further described in conjunction with the figures, and in associated description below. It should be noted that the description and figures merely illustrate principles of the present subject matter. Therefore, various assembly that encompass the principles of the present subject matter, although not explicitly described or shown herein, may be devised from the description and are included within its scope.

An example rivet-type fastener is depicted in FIG. 1. FIG. 1 illustrates a perspective view of a rivet-type fastener 100 (referred to as fastener 100), in accordance with one implementation of the present subject matter. In one example, the fastener 100 includes a fastener pin 102 and fastener body 104. The fastener body 104 is adapted to seat within holes in articles to be fastened together by fastener 100. To this end, the fastener body 104 further includes a collared portion 106 having a central axis. The collared portion 106 is such that it allows the fastener body 104 to be supported and positioned onto the surface of the article which is to be securely affixed to the body of the automobile. Continuing further, the collared portion 106 may further include a through central opening 108. In an example, the central opening 108 may be centred about the central axis of the collared portion 106. The shape of the central opening 108 may be such that it allows the passage of the fastener pin 102 either partially, i.e., when the fastener pin 102 is to be secured to the fastener body 104 to avoid misplacing or loss, or fully, i.e., when the fastener pin 102 is fully inserted into the fastener body 104 to securely attach the article to the body of the automobile.

The fastener body 104 further include a plurality of elongated portion(s) 110-1, 2 . . . , 4, which extend orthogonally with respect to the plane in which collared portion 106 is present. Each of the elongated portion(s) 110-1, 2 . . . , 4 (collectively referred to as the elongated portion(s) 110) are independent with respect to each other and are radially positioned about the central axis and about the edges of the central opening 108. Furthermore, the positioning of the elongated portion(s) 110 may be such that each of the adjoining elongated portion(s) 110 define an elongated spacing 112 (between adjacent elongated portions), and a collective central space 114 in between. As would be described, the elongated portion(s) 110 are moveable.

In the example as illustrated, the ends of the elongated portion(s) 110 may be further provided with corresponding enlarged portion(s) 116. The enlarged portion(s) 116 may further include corresponding tapered end(s) 118. The tapered end(s) 118 on the bottom of the body provide a narrow entrance as compared to the holes present in the articles in which the fastener is to be installed. As the fastener body 104 is inserted, the tapered end(s) 118 may initially pass through the hole (not shown in FIG. 1). As the fastener body 104 is pushed further, the tapered profile of the tapered end(s) 118 may result in the movement of the elongated portion(s) 110 into the central space 114. As the enlarged portion(s) 116 passes through the hole, the elongated portion(s) 110 may retain their original positions, with the fastener body 104 being prevented from being withdrawn from the hole in which it was inserted.

The form of the fastener body 104 as just described is exemplary only, and the subject matter can be used with other types of bodies. For example, the length of the elongated portions may be determined according based on the thickness of the article which is to be attached to the body of the automobile. Although FIG. 1 depicts only four elongated portion(s) 110, the number of elongated portion(s) 110 may vary without deviating from the scope of the present subject matter.

The fastener pin 102 includes a head portion 120 and a shaft 122. The head portion 120 of the fastener pin 102 may be planar. For example, the head portion 120 may be circular in shape. Continuing further the shaft 122 extends axially from the head portion 120. In an example, the axis of the shaft 122 and the central point of the head portion 120 may be coinciding. The fastener pin 102 is positioned for insertion through the central opening 108 provided in fastener body 104. The fastener pin 102 when inserted is to engage with either the elongated portion(s) 110 of the fastener body 104 or with the internal edges of the central opening 108. In an example, the shaft 122 may further include spring element 124. The spring element 124 is moveable from its original position (i.e., when no force is applied or when no surface abuts against it) to a position which is closer to the shaft 122 (i.e., when a force is applied or a surface, such as the edge of the central opening 108 abuts against it).

Additional aspects of the fastener pin 102 are further described in conjunction with FIGS. 2A-2B. FIG. 2A depicts a cross-sectional view of an assembly 200, depicting a cross-sectional view of the fastener 100 along with the fastener pin 102 and the fastener body 104, as per another example. FIG. 2B, on the other hand, provides a perspective view of an example fastener pin 102. In operation, the fastener 100 may be deployed within the central opening 108, with the elongated portion(s) 110 extending through central opening 108 which extends through a layer of an article 206 and through a portion of the body of the automobile, depicted as body 208. The shaft 122 of the fastener pin 102 further comprises a spring element 124. The distal end of the shaft 122 is further provided with a cantilevered snap element 202 (interchangeably referred to as the snap element 202). The snap element 202, depicted in FIG. 2B, may be provided at a distal end of the shaft 122. The snap element 202 may be such that a portion of the snap element 202 is flexibly moveable with respect to the axis of shaft. For example, the snap element 202 is flexibly moveable such that it may deform from its original configuration (when in a non-deformed state), and move towards the axis of the shaft 122, as will be explained in the following paragraphs.

In an example, the snap element 202 may have a tapered profile, with the snap element 202 being narrow at the end of the shaft 122, and broader as one proceeds away from the end of the shaft 122. As a result of the tapered profile, the cross-sectional diameter of the central opening 108 is less than the cross-sectional diameter of the snap element 202. In operation, the fastener body 104 may be inserted initially.

Once the fastener body 104 is inserted, the fastener pin 102 may be inserted through the central opening 108. As the fastener pin 102 is inserted, the end of the shaft 122 moves beyond the inner edges 204 of the central opening 108. When inserted partially, the snap element 202 results in retaining the fastener pin 102 within the fastener body 104, thereby reducing the possibility of loss of the fastener pin 102. When fully inserted, the spring element 124 engages with the inner edges 204 of the central opening 108 to retain the fastener pin 102 into the fastener body 104 of the fastener 100, When being inserted, the snap element 202 moves along the elongated spacing 112 present between the adjacent elongated portion(s) 110. These and other aspects are further described in conjunction with the remaining figures.

FIG. 3A-3C illustrates the example fastener 100, in various stages of installation. As depicted in FIG. 3A, the fastener body 104 is to receive the fastener pin 102. To this end, the fastener pin 102 is brought closer to the central opening 108 present within the fastener body 104. When being inserted, a distal end 302 of the shaft 122 of the fastener pin 102 approaches the inner edges 204 of the central opening 108. In an example, the cross-section of the distal end 302 may be less than the cross-section of the central opening 108. As the fastener pin 102 is further inserted, the distal end 302 of the shaft 122 proceeds beyond the edge 204. The fastener pin 102 proceeds further till the edges 204 comes into contact with the surface of the snap element 202. At this stage, it may be noted that the fastener pin 102 is not engaged with the fastener body 104 of the fastener 100.

As the fastener pin 102 is pushed further inwards through the central opening 108, the cantilevered snap element 202 may slightly deform and move inwards towards the shaft 122 of the fastener pin 102, as it abuts against the edge 204. The snap element 202 continues to move further towards the shaft 122 as the shaft 122 of the fastener pin 102 moves through the central opening 108 of the fastener body 104. As the fastener pin 102 moves further, the edges of the snap element 202 may cross the edges 204 of the central opening 108. At this stage, the surface of the snap element 202 is no longer in contact with the edge 204 of the central opening 108. The snap element 202, thereafter, may again retain its original configuration and shape, such that the edges of the cantilevered snap element 202 may abut and interfere with the edges 204 of the central opening 108.

Owing to the obstruction offered by the edges 204, the fastener pin 102 is retained within the fastener body 104 when inserted partially (as depicted in FIG. 3B). Since the fastener pin 102 is retained within the fastener body 104, misplacing or loss of the fastener pin 102 during installation of the fastener 100 may be minimized. Furthermore, in cases where installation space restricts manoeuvrability and is not sufficient for inserting the fastener pin 102, the fastener 100 with the partially inserted fastener pin 102 may be deployed together. Once the fastener body 104 is inserted into the hole through the article (which is to be secured) and the automobile body, the partially inserted fastener pin 102 may be manually pushed completely inside the fastener body 104 to secure the fastener 100 (as depicted in FIG. 3C).

FIG. 3C depicts a stage when the fastener pin 102 is completely inserted into the fastener body 104 of the fastener 100. As depicted in FIG. 3B, when partially inserted, the spring element 124 may be in its original position is not in contact with any portion of the fastener body 104. As the fastener pin 102 is being pushed through the central opening 108, the spring element 124 gets pressed by the edges 204, as a result of which it moves closer to the shaft 122. As the spring element 124 crosses the collared portion 106, it snaps back moving away from the shaft 122 resuming its original position, and locks against the edge 204 of the collared portion 106. The locking action of the spring element 124 secures the fastener pin 102 within the fastener body 104. In an example, the shape of the spring element 124 may be so adapted so as to permit engagement of the spring element 124 with the fastener body 104. The manner in which the spring element 124 engages with the edge 204 of the collared portion 106 is further depicted and described in conjunction with FIG. 4.

Figure 4:
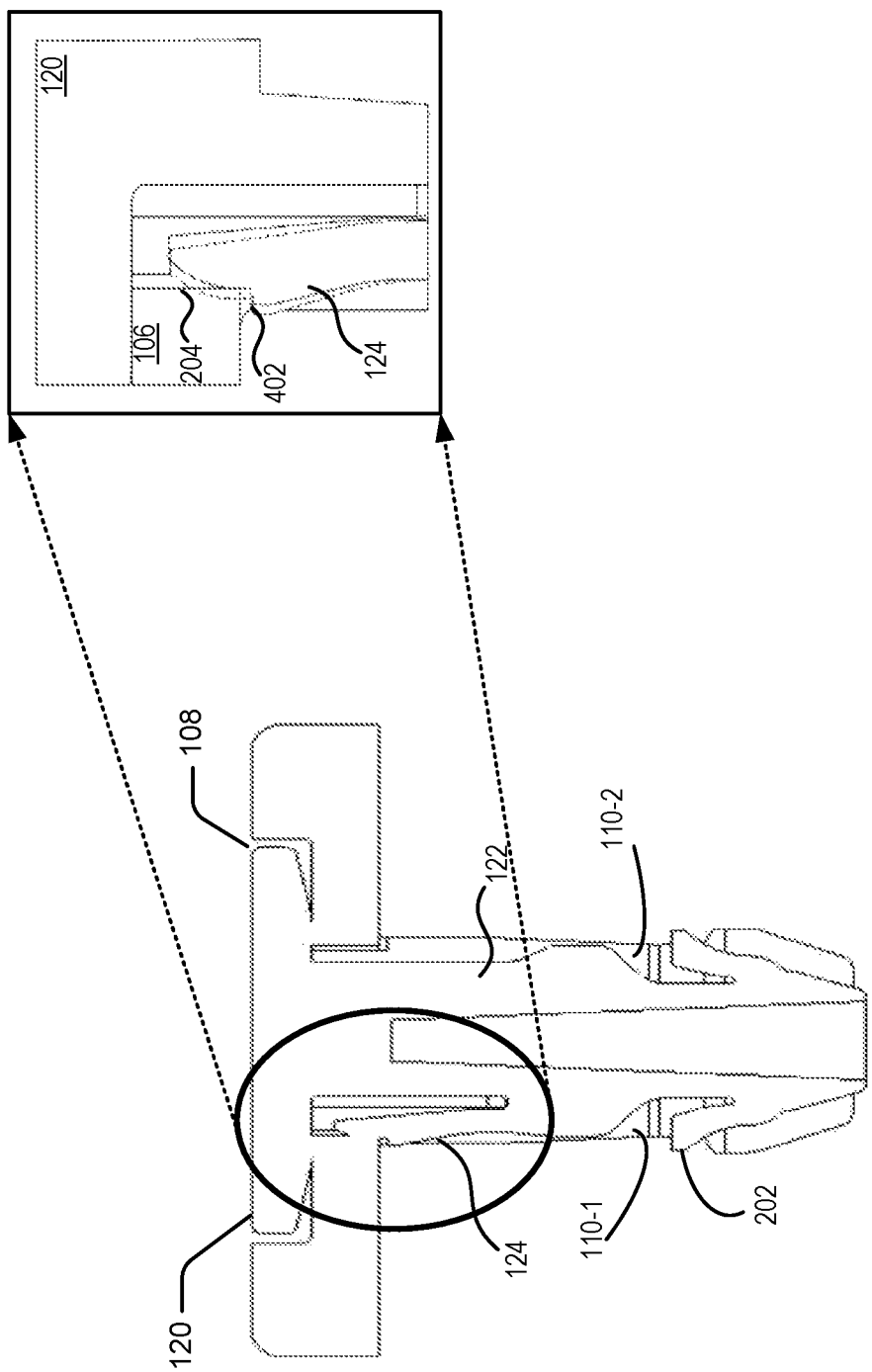
FIG. 4 illustrates an expanded view of a spring element of a rivet-type fastener, in accordance with an example of the present subject matter.

As described in conjunction with FIGS. 3A-3C, when the fastener pin 102 is fully inserted into the fastener body 104, the spring element 124 engages and locks with the edges 204 of the central opening 108, thereby securing the fastener pin 102 when fully inserted into the fastener body 104. FIG. 4 provides an expanded view of a portion of the spring element 124, as per one example. As depicted in FIG. 4, the spring element 124 positioned along the length of the fastener pin is further provided with a profiled edge 402. In an example, the profile edge 402 is L-shaped so as rigidly engage with the edge 204, when the fastener pin 102 is fully inserted. As the fastener pin 102 passes through the central opening 108, the profiled edge 402 engages with the edge 204 of the collared portion 106. When fully inserted, the L-shaped profile or the profiled edge 402 abuts against the shape of the edge 204, thereby preventing any movement of the fastener pin 102 away from the fastener body 104 in the axial direction. It may be noted that the shape of the profiled edge 402, as depicted in FIG. 4, is only one of the other possible examples. Other example shapes of the profiled edge 402 may also be utilized without deviating from the scope of the present subject matter.

As described in conjunction with the preceding figures, the fastener pin 102 may be partially inserted, initially, owing to which the fastener pin 102 is retained within the fastener body 104 to prevent any loss or misplacement of the fastener pin 102 during installation. Thereafter, the fastener body 104 (with the partially inserted fastener pin 102) may be deployed to secure an article to the body of the automobile. Thereafter, the fastener pin 102 may be fully inserted into the fastener body 104. When fully inserted, the fastener pin 102 causes the fastener body 104 to be rigidly held within the hole in which the fastener body 104 was inserted.

Figure 5:
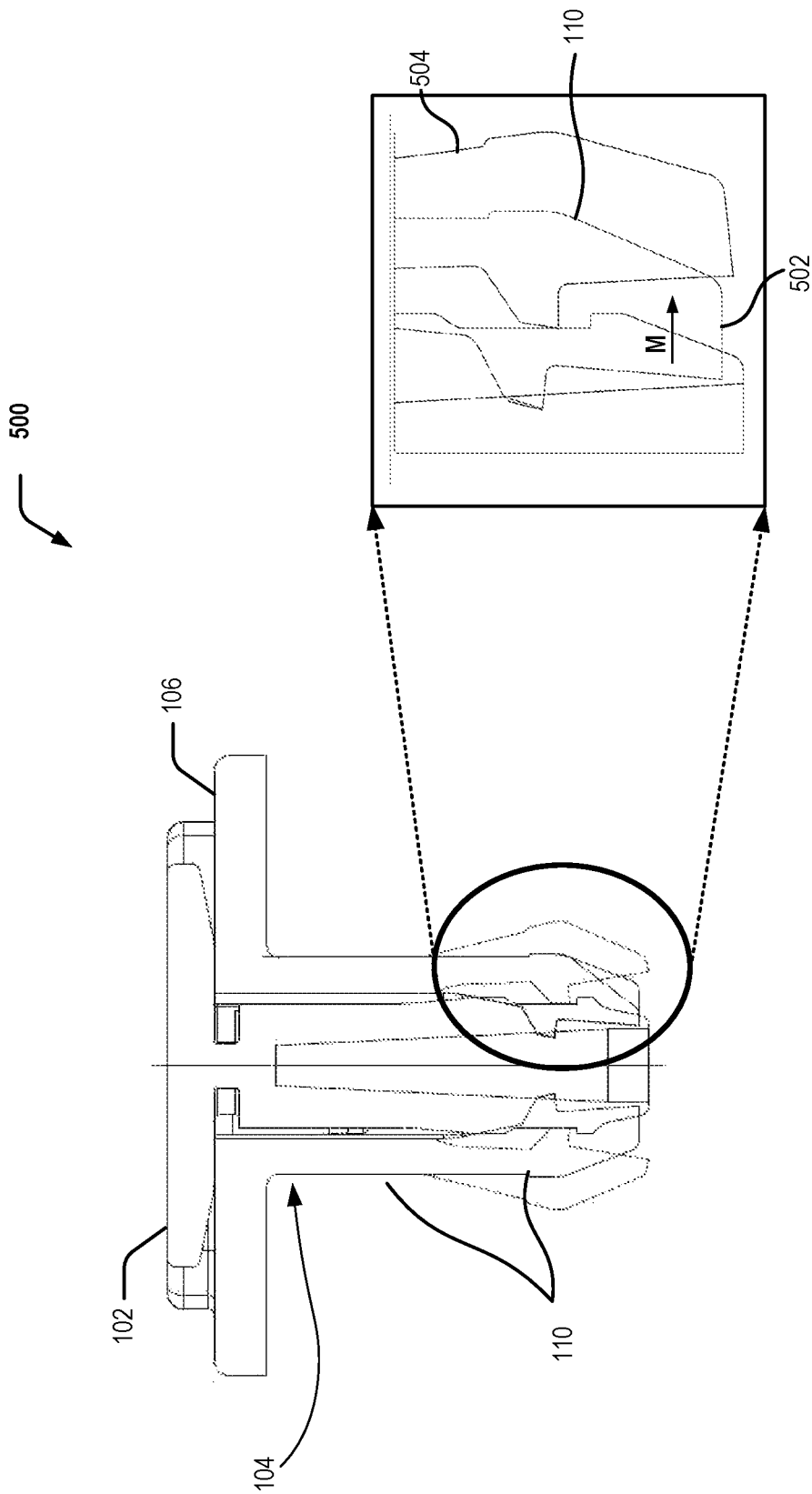
FIG. 5 illustrates an expanded view of various portions of a rivet-type fastener, in accordance with one implementation of the present subject matter.

The rigid securing of the fastener body 104 is explained on conjunction with FIG. 5. FIG. 5 illustrates a cross-sectional view of an example fastener 500, such as fastener 100. Prior to the insertion of the fastener pin 102 into the fastener body 104, the elongated portion(s) 110 of the fastener body 104 are at their original position 502 (as shown in dotted lines). The end of the elongated portion(s) 110 being rigidly coupled to the collared portion 106 of the fastener body 104, may move about the original position 502. As discussed in conjunction with FIG. 1-2, the elongated portion(s) 110 may move inwards into the central space 114.

As the fastener pin 102 is inserted into the fastener body 104, the shaft 122 of the fastener pin 102 contacts the inner surfaces of the elongated portion(s) 110 of the fastener body 104. As the fastener pin 102 moves further inwards through the central opening 108, the shaft 122 urges the elongated portion(s) 110 to move in a radially outward direction to accommodate the fastener pin 102. The radially outward movement of one of the elongated portion(s) 110 is depicted by the arrow M. When the fastener pin 102 is completely pushed in, the elongated portion(s) 110 move outwards from their original position 502 to assume the position 504. In one example, the lengths of the fastener pin 102 and the elongated portion(s) 110 are such, that when the fastener pin 102 is fully inserted and engaged, the leading edge of the shaft 122 and the elongated portion(s) 110 are in line.

In another example, the leading edge of the shaft 122 extends beyond the distal ends of the elongated portion(s) 110. In such case, the elongated portion(s) 110 when present in the position 504, have their edges which are in line with the distal edges of the shaft 122 of the fastener pin 102. Furthermore, the greater length of the elongated portion(s) 110 provides better retention capability, when the fastener body 104 is positioned while securing an article to the body of the automobile, under consideration. In another example, the outer surfaces of the elongated portion(s) 110 may be further provided with ribbed protrusion which further enhance the engagement of the elongated portion(s) 110 with the inner surfaces of the hole in which the fastener body 104 is inserted.

Figure 6:
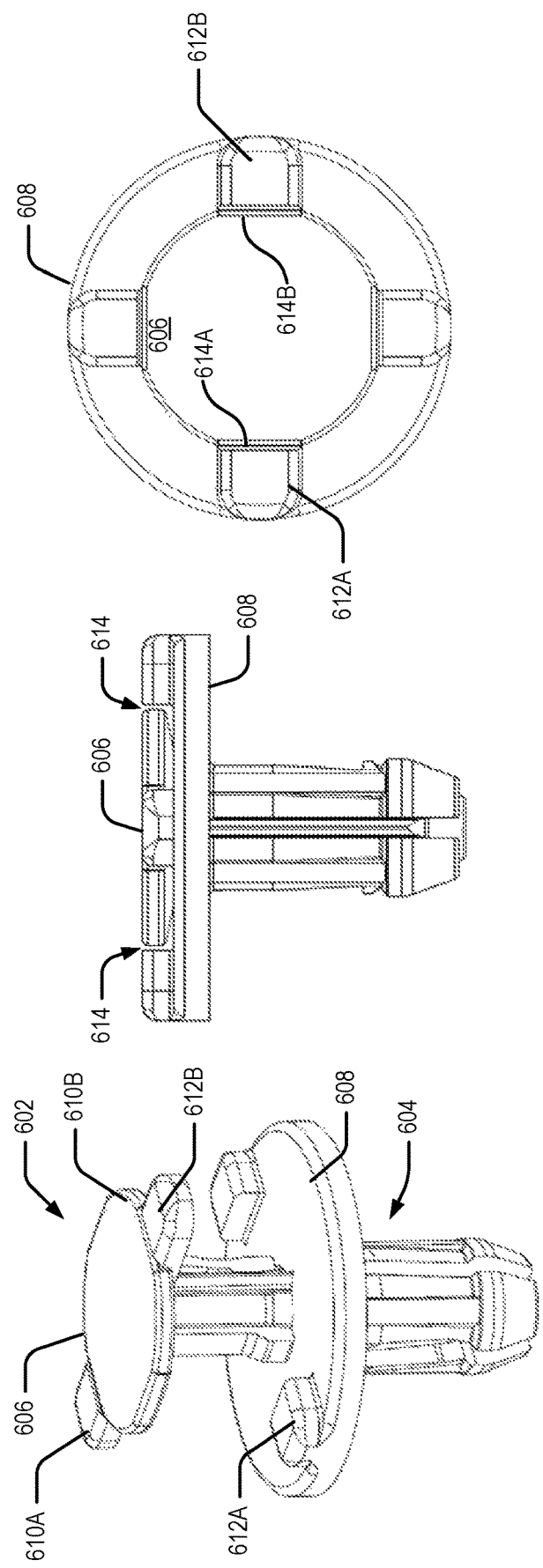
FIG. 6A illustrates a perspective view of the rivet-type fastener, in accordance with another example of the present subject matter.
FIG. 6B illustrates a front view of the rivet-type fastener, in accordance with an example of the present subject matter
FIG. 6C illustrates a top view of the rivet-type fastener, in accordance with an example of the present subject matter.

The fastener 100 as discussed in conjunction with the previous figures may include a plurality of protrusions provided on the fastener pin and the fastener body 104. These aspects are further explained in conjunction with FIGS. 6A-6C. FIG. 6A illustrates a front perspective view of an example fastener 600. The fastener 600 further includes the fastener pin 602 and the fastener body 604. Similar to the previous figures, the fastener pin 602 further includes a head portion 606 and the fastener body 604 includes a collared portion 608. The head portion 606 of the fastener pin 602 may further include a pair of protrusions 610A and 610б (collectively referred to as protrusions 610). In an example, the protrusions 610 may be located at diametrically opposite positions along the perimeter of the head portion 606. In an example, the protrusions 610 may aid in handling of the fastener pin 602 when it is being inserted into fastener body 604.

Continuing with the present example, the collared portion 608 of the fastener body 604 may further include a pair of raised projections 612A and 612B (collectively referred to as the projections 612) from the upper surfaces of the collared portion 608. In an example, the projections 612 may be positioned at diametrically opposite locations about the peripheral edges of the collared portion 608.

As described earlier, the fastener pin 602 may be fully inserted into the fastener body 604 for securing the article to the body of an automobile. FIG. 6C provides a top view of the fastener 600, when the fastener pin 602 is fully inserted into the fastener body 604. When fully inserted, the protrusions 610 and the projections 612 may be symmetrically arranged, such that the distance between adjacent protrusions 610 and projections 612 is the same. For example, the distance between the protrusion 610A, and projections 612A and 612B is the same. In a similar manner, the distance between the projection 612A and the protrusions 610A and 610B is the same.

In an example, when the fastener pin 602 is fully inserted, the edges of the head portion 606 and raised projections 612 define access channels 614, therein. For example, an access channel 614A may be defined between the head portion 606 and the raised projections 612A, whereas another access channel 6146 may be defined between the edges of the head portion 606 and the projections 6126. The access channels 614A and 614B provide an access point for a prying tool. The prying tool may be inserted into one of the access channels 614A and 614B to disengage the spring element 124 (as described in FIG. 1) when used as a lever. For example, when the prying tool is used, a sufficient force may be applied to overcome the abutting force between the spring element 124 and the edges 204 of the central opening 108. Once the abutting force between the spring element 124 and the edges 204 is overcome, the spring element 124 dislodges from the edges 204, enabling the fastener pin 602 to be partially free from the fastener body 604. An example of a prying tool includes, but is not limited to, a screw driver, which may be inserted into any one of the channels 614A and 614B to dislodge the fastener pin 602 partially from the fastener body 604.

Figure 7:
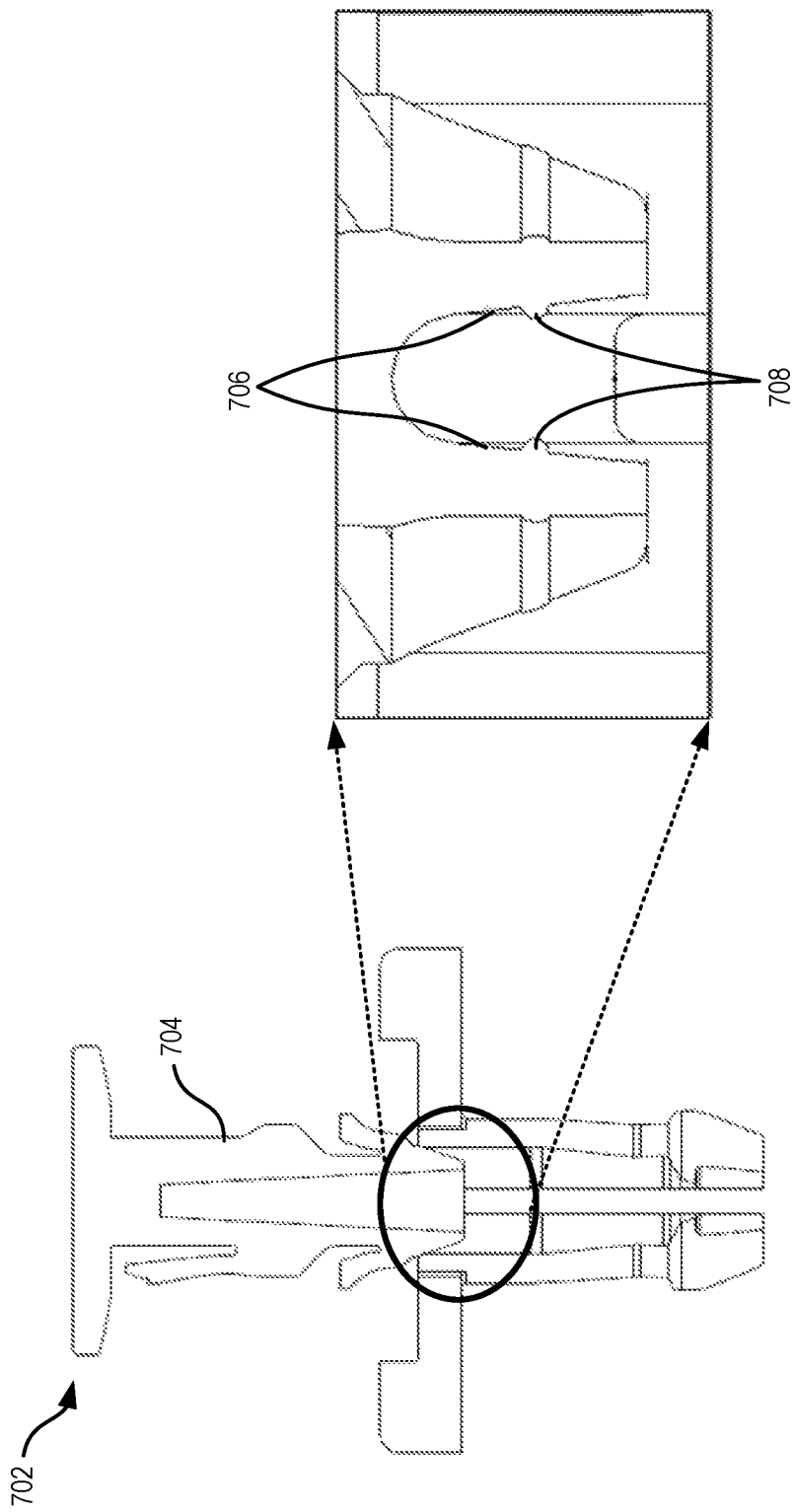
FIG. 7 illustrates an expanded view of a portion of the rivet-type fastener, in accordance with one example of the present subject matter.

The construction of the fastener pin may be of plastic material or such similar material. In an example, the fastener pin may be hollow. FIG. 7 illustrates a cross-section of the fastener pin 702 as per one example. The inner surface 706 of the shaft 704 of the fastener pin 702, further encloses an internal space. In an example, the inner surface 706 includes a structural groove 708. The structural groove 708 contributes to the ease of ejection of the fastener pin 702 during the process for manufacturing of the rivet-type fastener, such as the fastener 100. The groove 708 may be provided towards the end of the shaft 704 and extends in a circular path around the inner surface 706 of the shaft 704. In one example, the inner surface 706 may include a plurality of grooves 708.

FIGS. 8A-8C provides a cross-sectional view and a perspective views of example fastener 800 when installed to secure an article to body of an automobile. In certain instances, underside corner of the collared portion, i.e., the portion where the collared portion 806 meets the elongated portion(s) 808, may be rounded. Such an instance is depicted in FIG. 8A, depicting a fastener 800. The fastener 800, as depicted, includes a fastener pin 802 which is inserted into the fastener body 804, with the fastener body 804 further comprising a collared portion 806. Furthermore, a plurality of elongated portion(s) 808 extend from the collared portion 806. Thereafter, the fastener 800 may be deployed within the hole 810, with the elongated portion(s) 808 extending through hole 810 which extends through a layer of an article 812 and through a portion of the body of the automobile, depicted as body 814. The portion of the fastener 800 where collared portion 806 meets the elongated portion(s) 808 is indicated as rounded portion 816.

Continuing further, the hole 810 extending through the article 812 and the body 814 is uniform, i.e., the diameter of the hole formed through the article 812 and the body 814 is the same. Furthermore, the diameter as described by the elongated portion(s) 808 may be equal to the diameter of the hole 810. In such instances, it is possible, that the fastener body 804 when inserted into the hole 810, may not be fully supported when the fastener pin 802 is inserted completely in the fastener body 804. For example, as illustrated in FIG. 8A, the fastener body 804 may be inserted into the hole 810 which extends through the article 812 and the body 814. As the fastener body 804 is inserted, the edge of the hole, depicted as edge 818 moves along the outer surfaces of the elongated portion(s) 808. As the edge 818 moves further, it may encounter the lower portion of the rounded portion 816. Owing to the curvature of the rounded portion 816, the edge 818 may not be able to completely come into contact with the lower surface of the collared portion 806, thereby resulting in the formation of a gap 820.

As would be understood, owing to the gap 820, the collared portion 806 of the fastener body 804 may not be suitably supported by the upper surfaces of the article 812. As a result, the fastener body 804, when subject to uneven forces it may result in bending of the collared portion 806. This in turn may impact the structural integrity of the fastener 800. In addition, the formation of the gap 820 may also result in the improper securing of the article 812 to the body 814. Furthermore, the gap 820 may also result in accumulation of debris and waste, which in turn, may further impact the securing of the article 812 to the body 814.

To this end, a fastener 850, as depicted in FIGS. 8B-8C, is described. In an example, the fastener 850 may further include a fastener pin 852 which is insertable into a fastener body 854. The fastener body 854 may further include collared portion 856. The collared portion 856 includes a centrally located opening 858, which extends axially through the collared portion 856. The collared portion 856 may further include downward extending protrusion(s) 860-1, 2 (collectively referred to as protrusion(s) 860) and elongated portion(s) 862. The collared portion 856 and the elongated portion(s) 862 extend and are joined at rounded portion 864. The extent to which the protrusion(s) 860 may extend in the downward direction may be determined based on gap 866 which may be present between a portion of lower surface of the collared portion 856 and a surface of the article which is to be secured to the body of the automobile. The protrusion(s) 860 from the lower surface of the collared portion 856 provide adequate support to the collared portion 856, in the event that a gap 866 is formed as a result of the rounded portion 864 (as explained with respect to fastener 800).

FIG. 8C provide a bottom perspective view of the fastener 850, which further include protrusion(s) 860. The protrusion(s) 860 may be such that they extend from a semi-circular segment of the collared portion 856. It may be noted that the shape and configuration of the protrusion(s) 860 as depicted in FIG. 8C is only one of the other possible example. The protrusion(s) 860 may be implemented as other different shapes without deviating from the scope of the present subject matter.

Although aspects and other examples have been described in a language specific to structural features and/or methods, the present subject matter is not necessarily limited to such specific features or elements as described. Rather, the specific features are disclosed as examples and should not be construed to limit the scope of the present subject matter.

We claim:
1. A rivet-type fastener comprising:
 a fastener pin having:
  a planar head portion;
  a shaft longitudinally extending along an axis of the shaft from the planar head portion;
  a cantilevered snap element provided along the shaft toward a distal end of the shaft that is opposite the planar head portion, a portion of the cantilevered snap element being flexibly moveable with respect to the axis of the shaft; and
  a cantilevered spring element provided along the shaft between the cantilevered snap element and the planar head portion; and
 a fastener body having:
  a collared portion having a central opening centered about a central axis of the collared portion, the central opening having a cross-sectional diameter that is less than a cross-sectional diameter of the cantilevered snap element; and
  a plurality of elongated portions extending orthogonally from the collared portion and positioned radially about the central axis and about edges of the central opening such that at least one elongated space is defined between two adjacent elongated portions of the plurality of elongated portions that extends from the collared portion and through an end of the fastener body that is opposite the collared portion,
  wherein the shaft of the fastener pin has a shaft opening longitudinally extending along the axis of the shaft from the distal end of the shaft toward the planar head portion and past at least a portion of the cantilevered snap element,
  wherein the fastener body receives the fastener pin through the central opening, and, as the cantilevered snap element passes through the central opening, the fastener body causes the cantilevered snap element to flexibly deform from an original configuration and move towards the axis of the shaft, and
  wherein, when the fastener pin is completely inserted into the fastener body, the cantilevered spring element engages with inner edges of the central opening such that the fastener pin is retained within the fastener body.

2. The rivet-type fastener as claimed in claim 1, wherein the original configuration of the cantilevered snap element is regained after the cantilevered snap element has completely passed through the central opening such that the fastener pin is retained within the fastener body by the cantilevered snap element.

3. The rivet-type fastener as claimed in claim 1, wherein the fastener pin is further moveable through the central opening after the cantilevered snap element has completely passed through the central opening.

4. The rivet-type fastener as claimed in claim 1, wherein the cantilevered snap element has a tapered profile, the cantilevered snap element being narrower toward the distal end of the shaft and broader along a length of the shaft moving toward the planar head portion.

5. The rivet-type fastener as claimed in claim 1, wherein the cantilevered spring element comprises a profiled edge that engages with the inner edges of the central opening when the fastener pin is completely inserted into the fastener body.

6. The rivet-type fastener as claimed in claim 1, wherein the plurality of elongated portions of the fastener body further comprise a ribbed protrusion that restricts motion of the fastener body with respect to a body of a vehicle.

7. The rivet-type fastener as claimed in claim 1, wherein the planar head portion of the fastener pin comprises a pair of protrusions located at positions along a perimeter of the planar head portion.

8. The rivet-type fastener as claimed in claim 1, wherein upper surfaces of the collared portion comprise a pair of raised projections.

9. The rivet-type fastener as claimed in claim 8, wherein access channels are defined between edges of the planar head portion and the pair of raised projections when the fastener pin is fully inserted into the fastener body.

10. The rivet-type fastener as claimed in claim 9, wherein, the access channels are configured to receive a prying tool, and
 wherein, when a sufficient force is applied by the prying tool inserted into the access channels, the cantilevered spring element is configured to dislodge from the inner edges of the central opening such that the fastener pin is partially free from the fastener body.

11. An assembly comprising:
 an article having an opening;
 a fastener pin having:
  a planar head portion;
  a shaft longitudinally extending along an axis of the shaft from the planar head portion;

a cantilevered snap element provided along the shaft toward a distal end of the shaft that is opposite the planar head portion, a portion of the cantilevered snap element being flexibly moveable with respect to the axis of the shaft; and a spring element provided along the shaft between the cantilevered snap element and the planar head portion, the spring element having a profiled edge arranged toward an end of the spring element; and a fastener body fitted into the opening of the article, the fastener body having:

a collared portion having a central opening centered about a central axis of the collared portion, the central opening having a cross-sectional diameter that is less than a cross-sectional diameter of the cantilevered snap element; and a plurality of elongated portions extending orthogonally from the collared portion and positioned radially about the central axis and about edges of the central opening, the plurality of elongated portions being independently movable relative to each other and relative to the central opening, wherein the shaft of the fastener pin has a shaft opening longitudinally extending along the axis of the shaft from the distal end of the shaft toward the planar head portion past at least a portion of the cantilevered snap element, wherein the fastener body receives the fastener pin through the central opening, and, as the cantilevered snap element passes through the central opening, the fastener body causes the cantilevered snap element to flexibly deform from an original configuration and move towards the axis of the shaft, and wherein, when the fastener pin is completely inserted into the fastener body, the profiled edge of the spring element is configured to retain the fastener pin within the fastener body.

12. The assembly as claimed in claim 11, wherein the original configuration of the cantilevered snap element is regained after the cantilevered snap element has completely passed through the central opening such that the fastener pin is retained within the fastener body by the cantilevered snap element.

13. The assembly as claimed in claim 11, wherein the fastener pin is further moveable through the central opening after the cantilevered snap element has completely passed through the central opening.

14. The assembly of claim 11, wherein a structural groove is defined on an inner surface of the shaft of the fastening pin, the structural groove being provided toward the distal end of the shaft.

15. The assembly of claim 11, wherein the profiled edge of the fastener pin is configured to engage inner edges of the central opening of the fastener body when the fastener pin is completely inserted into the fastener body.

16. The assembly of claim 15, wherein, when a sufficient force is applied to the fastener pin, the profiled edge of the spring element is configured to dislodge from the inner edges of the central opening of the fastener body such that the fastener pin is partially free from the fastener body.

* * * * *